(12) United States Patent
Moronval

(10) Patent No.: US 8,430,041 B2
(45) Date of Patent: Apr. 30, 2013

(54) TABLE TO BE SET UP IN A PASSENGER RAILWAY VEHICLE

(75) Inventor: Frederic Moronval, Angers (FR)

(73) Assignee: Societe Nationale des Chemins de Fer Francais SNCF, Paris (FR)

( * ) Notice: Subject to any disclaimer, the term of this patent is extended or adjusted under 35 U.S.C. 154(b) by 53 days.

(21) Appl. No.: 13/063,681

(22) PCT Filed: Sep. 18, 2009

(86) PCT No.: PCT/FR2009/051756
§ 371 (c)(1),
(2), (4) Date: Mar. 11, 2011

(87) PCT Pub. No.: WO2010/031971
PCT Pub. Date: Mar. 25, 2010

(65) Prior Publication Data
US 2011/0162561 A1 Jul. 7, 2011

(30) Foreign Application Priority Data
Sep. 18, 2008 (FR) ..................... 08 56285

(51) Int. Cl.
*A47B 3/00* (2006.01)
(52) U.S. Cl.
USPC ........................................ 108/115; 108/44
(58) Field of Classification Search .............. 108/115, 108/44, 45, 33, 34, 41, 38, 77, 79, 67, 68
See application file for complete search history.

(56) References Cited

U.S. PATENT DOCUMENTS

| | | | | | |
|---|---|---|---|---|---|
| 1,234,103 | A | * | 7/1917 | Stone | 108/67 |
| 2,187,423 | A | * | 1/1940 | Hyland | 108/77 |
| 2,926,794 | A | * | 3/1960 | Karoff | 108/99 |
| 3,436,092 | A | * | 4/1969 | Werner | 108/115 |
| 5,052,308 | A | * | 10/1991 | Brown | 108/115 |
| 5,961,191 | A | * | 10/1999 | Taylor | 108/98 |
| 6,032,587 | A | * | 3/2000 | Salenbauch et al. | 108/44 |
| 6,405,660 | B2 | * | 6/2002 | Itakura et al. | 108/115 |
| 6,925,944 | B1 | * | 8/2005 | Miller et al. | 108/115 |
| 8,109,526 | B2 | * | 2/2012 | Mason et al. | 280/47.35 |
| 8,196,529 | B2 | * | 6/2012 | Witkowski | 108/115 |
| 2009/0000522 | A1 | * | 1/2009 | Collins et al. | 108/115 |

FOREIGN PATENT DOCUMENTS

| | | |
|---|---|---|
| DE | 3942629 A1 | 6/1991 |
| DE | 9206638 U1 | 8/1992 |
| EP | 1514760 A1 | 3/2005 |

OTHER PUBLICATIONS

International Search Report, Mailed Dec. 1, 2010, 2 pages.

* cited by examiner

*Primary Examiner* — Jose V Chen
(74) *Attorney, Agent, or Firm* — Harris Beach PLLC

(57) ABSTRACT

Table designed to be set up in a passenger railway vehicle and positioned between at least two seats facing each other, the said table comprising at least two folding trays, each tray facing a seat and comprising a first portion hinged to a second portion at an edge characterised in that it comprises a fixed housing positioned above the plane defined by the trays when they are in a horizontal unfolded position, the said fixed housing being capable of receiving the trays when they are in a vertical folded back position in which the first and second portion are arranged vertically against each other, the second portion being hinged to the fixed housing at an edge opposite the edge cooperating with the first portion of the tray.

5 Claims, 1 Drawing Sheet

TABLE TO BE SET UP IN A PASSENGER RAILWAY VEHICLE

CROSS REFERENCE TO RELATED APPLICATIONS

This application is a National Stage application under 35 U.S.C. §371 of PCT Application No. PCT/FR09/051756, filed on Sep. 18, 2009, which claims priority to French Application No. FR 0856285, filed Sep. 18, 2008, entitled "Table To Be Set Up In Passenger Railway Vehicle."

FIELD OF THE INVENTION

This invention relates to the field of tables installed in passenger railway vehicles. It concerns more particularly tables set up between at least two seats facing each other and generally described as "facing tables". These tables can be of the "single" type when they are positioned between two seats facing each other or of the "double" type when they are positioned between four seats facing each other in pairs.

BACKGROUND OF THE INVENTION

It is generally known how to create a facing table made up of two trays. Each tray has a moveable portion hinged to a fixed portion. In this case, once the movable portion is folded back, it comes into contact with the fixed portion positioned horizontally in the plane defined by the tray when the latter is unfolded. Consequently, even in the folded position, this type of tray still occupies a large volume in the horizontal unfolded plane of the tray.

Consequently, when the table is of the double type, it may be difficult for all users of the railway vehicle to access or leave their seats if the table is on the window side. Similarly, for a person who has difficulty in moving such as an elderly person, a person burdened with luggage or even an injured person, this difficulty is then accentuated. It may also be impossible for a wheelchair user to transfer to a passenger seat that faces this type of tray.

Facing tables as described in document EP 1 514 760 are also known in which the trays comprise two movable portions that can be folded substantially vertically and sliding into a substantially vertical housing beneath the plane defined by the trays when the latter are unfolded.

Consequently, the housing enabling the trays to be stored when they are stowed away is located at the level of the passenger's knees and occupies a large volume which is indeed an encumbrance for any user who requires or prefers extra leg-room as well as for persons of reduced mobility wishing to transfer from a wheelchair to a passenger seat positioned opposite a facing table.

Furthermore, this type of device has a large number of mechanical parts, which makes it a complex device to manufacture and assemble, with its maintenance being very expensive.

Thus, the object of the invention is to provide a solution to reduce the space occupied by facing tables at leg and knee level.

Another aim is to limit the effort required to fold or unfold the trays and to be as intuitive as possible offering a technological solution that is simple to manufacture and use.

SUMMARY OF THE INVENTION

The invention therefore concerns a table designed to be set up in a passenger railway vehicle and positioned between at least two seats facing each other. Such a table comprises at least two folding trays, each tray facing a seat and comprising a first portion hinged to a second portion at an edge.

According to the invention, this table is characterised in that it comprises a fixed housing positioned above the plane defined by these trays when they are in a horizontal unfolded position. Said fixed housing is capable of receiving the trays when they are in a vertical folded back position in which the first and second portion are arranged vertically against each other, the second portion being hinged to the fixed housing at an edge opposite the edge cooperating with the first portion of the tray.

In other words, once the trays are folded back, they are positioned inside the fixed housing which is positioned above the working plane defined by the trays and consequently above the area occupied by the passenger's legs and knees. Such an arrangement of the trays therefore enables a person of reduced mobility to transfer from his/her wheelchair to the seat without being encumbered by the facing table and enables everyone to benefit from this free space.

In order to fold the trays back, a first hinged portion is thus folded on top of a second portion by making a rotating movement about a horizontal axis. This first portion then covers the second portion, then the assembly is folded into a vertical position inside the fixed housing. This rotating movement is made upwards and therefore requires no great effort on the part of the passenger in order to stow the tray away. In fact, this effort is less than 20 newtons and can be achieved by the palm of the user's hand. Such an operation and deployment of the tray is therefore easy and intuitive for the user.

Advantageously, the table may have a central foot. In this way, and particularly when two seats are arranged next to each other, the seat located in the aisle is easily accessible because the foot located in the centre of the table does not hinder the access to this first place next to the aisle.

In practice, the table may comprise two vertical end uprights. Thus, once the trays are folded back, they are protected in the fixed housing at their side edge. Such end uprights prevent the trays from being opened accidentally, particularly by a passenger passing along the aisle.

Other means can also prevent the trays from being accidentally unfolded. To achieve this, self-locking mechanical systems can in particular be incorporated into the thickness of the trays.

Moreover, braking means can slow down the opening of the trays and thus avoid abrupt and noisy opening so as to guarantee the comfort of the vehicle's passengers.

According to one particular embodiment, the table may have a supporting bar extending substantially horizontally between the two vertical end uprights. In this case, the fixed housing also enables the hinged edge between the first and second portions to be protected. Such a supporting bar can also assist a wheelchair user to transfer to the seat or stand up. It also allows any user to steady and guide himself/herself when moving. Such a supporting bar can also have light sources allowing the trays to be illuminated once they are unfolded.

Advantageously, the table can have a device that enables an SOS call to be made. This device can notably enable a train guard to be called if an incident occurs in the vehicle. In practice, this device can be positioned in the fixed housing. In fact, this positioning of the SOS call device facilitates its electrical connection to a general electrical harness and also enables it to be protected by thus preventing SOS calls from being unintentionally made by the passenger.

BRIEF DESCRIPTION OF THE DRAWINGS

Further features and advantages of the invention will emerge from the following description of a non-limiting embodiment which is shown by way of example in the accompanying drawings, in which.

DETAILED DESCRIPTION OF AN EMBODIMENT OF THE INVENTION

As previously stated, the invention relates to a table designed to be set up in a passenger railway vehicle.

Figure 1:
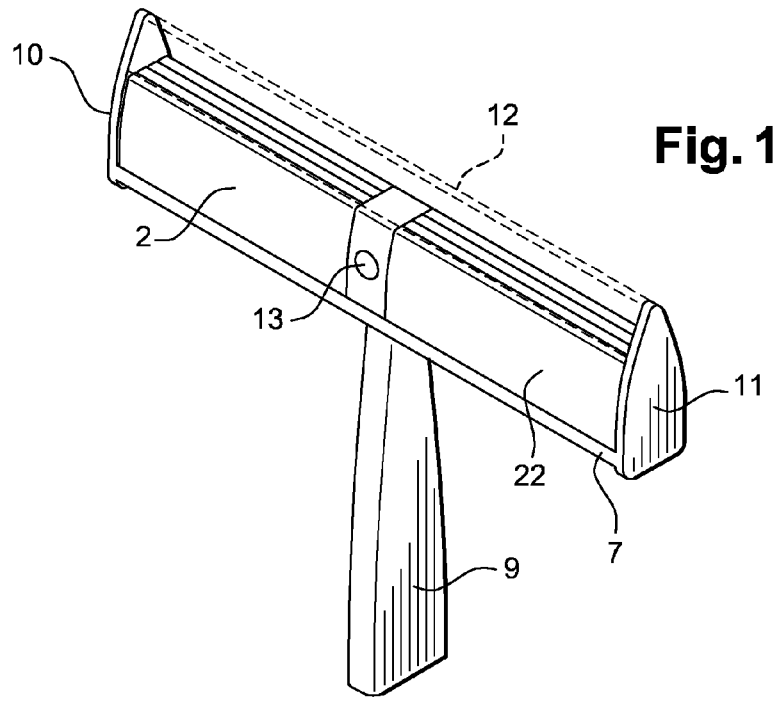
FIG. 1 is a perspective view of a table according to the invention.

As shown in FIG. 1, the table (1) comprises a fixed housing (7) into which trays (2, 22) can be folded. Advantageously, but not necessarily, the housing (7) can be delimited by two vertical end uprights (10, 11) and a supporting bar (12) which extends between these two uprights and covers the trays (2, 22). Furthermore, the fixed housing (7) can also incorporate a device (13) enabling an SOS call to be made, for example when an incident occurs inside a passenger vehicle.

Furthermore, the table (1) can have a central foot (9) enabling the fixed housing (7) incorporating the trays (2, 22) to be supported. Such a central foot (9) is therefore located in a vertical median plane of the table.

Figure 2:
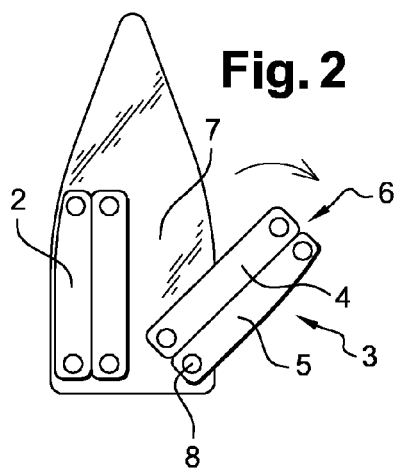
FIGS. 2 to 4 are cross-sectional views of the different opening stages of a tray.

As shown in FIG. 2, a fixed housing (7) has at least two trays (2, 3) each being positioned facing a seat. Each tray (3) comprises a first portion (4) hinged to a second portion (5) at a first edge (6).

To open the tray (3), the two portions (4, 5) are moved by rotating the assembly about an edge (8) opposite the edge (6).

Figure 3:
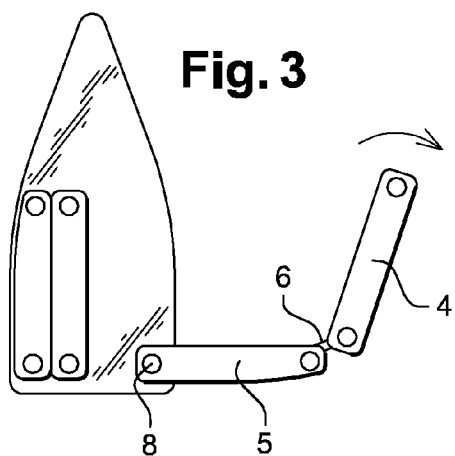

Once the assembly is rotated about 90 degrees, as shown in FIG. 3, the first portion (4) is rotated about the edge (6).

Figure 4:
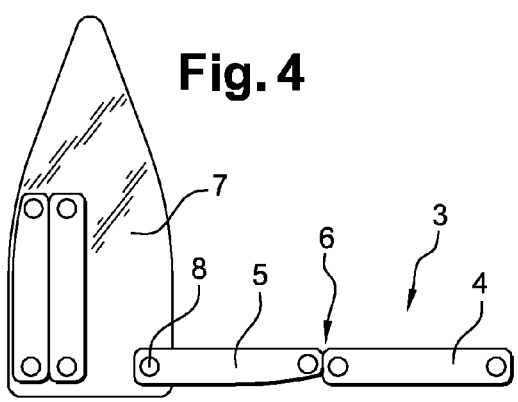

As shown in FIG. 4, the first portion (4) can rotate 180 degrees in relation to the second portion (5) to form a horizontal plane on which a passenger can place his belongings. Thus, as shown, the fixed housing (7) has a volume the bulk of which is positioned above the plane defined by the tray (3) in the unfolded position.

The reverse procedure is followed in order to close the tray (3). Thus, the first portion (4) is positioned in contact with the second portion (5) by rotating it about the edge (6). Lastly, the assembly formed by the two portions (4, 5) are rotated about the edge (8) to stow them in a vertical folded position inside the housing (7).

The preceding description shows that a table according to the invention has numerous advantages, namely:

it frees up the space around the knees and enables easy access to the seat, it thus increases the available space and therefore affords greater comfort without changing the pitch separating two rows of seats, in other words without affecting the train's capacity, it requires no great effort to open and close, it has a very simple design and a limited number of parts, it ensures that documents are not forgotten or lost since they cannot slide between two trays, the top cover can help a person to stand up on getting out of his/her seat.

The invention claimed is:

1. A table designed to be set up in a passenger railway vehicle and positioned between at least two seats facing each other, the table comprising:

at least two folding trays, each tray facing a seat and each tray comprising a first portion hinged to a second portion at an edge;

a fixed housing positioned above the plane defined by the trays when they are in a horizontal unfolded position, the fixed housing being capable of receiving the trays when they are in a vertical folded back position in which the first and second portion are arranged vertically against each other, the second portion being hinged to the fixed housing at an edge opposite the edge cooperating with the first portion of the tray, and a central footing supporting the fixed housing near the midpoint of a major length of the table.

2. A table according to claim 1, further comprising two vertical end uprights.

3. A table according to claim 2, further comprising a supporting bar extending substantially horizontally between the two vertical end uprights.

4. A table according to claim 1, further comprising a device that enables an SOS call to be made.

5. A table according to claim 4, wherein the device is positioned in the fixed housing.